US009424237B2

(12) United States Patent
Anderson et al.

(10) Patent No.: US 9,424,237 B2
(45) Date of Patent: Aug. 23, 2016

(54) FLEXIBLE ANALYTICS-DRIVEN WEBPAGE DESIGN AND OPTIMIZATION

(71) Applicant: International Business Machines Corporation, Armonk, NY (US)

(72) Inventors: Taylor J. Anderson, Atlanta, GA (US); Thomas S. Brugler, Fuquay-Varina, NC (US); Richard Chen, Long Island City, NY (US); Randall A. Craig, Raleigh, NC (US); Kristin S. Moore, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/980,125

(22) Filed: Dec. 28, 2015

(65) Prior Publication Data

US 2016/0103807 A1    Apr. 14, 2016

Related U.S. Application Data

(63) Continuation of application No. 14/484,787, filed on Sep. 12, 2014.

(51) Int. Cl.
| | | |
|---|---|---|
| G06F 17/20 | (2006.01) | |
| G06F 17/22 | (2006.01) | |
| G06F 3/0481 | (2013.01) | |
| G06F 17/30 | (2006.01) | |
| H04L 12/26 | (2006.01) | |

(52) U.S. Cl.
CPC .......... *G06F 17/2247* (2013.01); *G06F 3/0481* (2013.01); *G06F 17/2288* (2013.01); *G06F 17/30899* (2013.01); *H04L 43/08* (2013.01)

(58) Field of Classification Search
CPC   G06F 17/241; G06F 17/2247; G06F 3/04883
See application file for complete search history.

(56) References Cited

U.S. PATENT DOCUMENTS

| | | | |
|---|---|---|---|
| 8,214,804 B2 | 7/2012 | Robertson | |
| 8,719,105 B2 | 5/2014 | Minnis et al. | |
| 2007/0198321 A1* | 8/2007 | Lakshminarayan | G06F 17/30864 705/7.33 |
| 2013/0031470 A1* | 1/2013 | Daly, Jr. | G06F 17/30893 715/243 |
| 2013/0246926 A1 | 9/2013 | Vemireddy | |

OTHER PUBLICATIONS

"What is A/B Testing? Optimizely: A/B Testing Simplified", Copyright 2014 Optimizely, <https://www.optimizely.com/ab-testing>.
"A/B testing", From Wikipedia, the free encyclopedia, printed Jun. 10, 2014, <http://en.wikipedia.org/wiki/A/B_testing>.
U.S. Appl. No. 14/484,787, filed Sep. 12, 2014, Entitled "Flexible Analytics-Driven Webpage Design and Optimization", 38 pages.
List of IBM Patents or Patent Applications Treated as Related, dated Feb. 23, 2016, 2 pages.

* cited by examiner

*Primary Examiner* — Stephen Hong
*Assistant Examiner* — Shahid Khan
(74) *Attorney, Agent, or Firm* — Edward J. Wixted, III (57) ABSTRACT

In an approach for selecting a version of a webpage to present to a user, a processor receives a request to access a webpage from a device, wherein the webpage includes a plurality of versions of the webpage. A processor receives information about the device. A processor determines a version of the webpage to present, based on the information about the device and a predefined goal associated with the webpage. A processor causes the version of the webpage to be presented.

1 Claim, 5 Drawing Sheets

FLEXIBLE ANALYTICS-DRIVEN WEBPAGE DESIGN AND OPTIMIZATION

FIELD OF THE INVENTION

The present invention relates generally to the field of web development, and more particularly to webpage design and optimization based on flexible web analytics.

BACKGROUND OF THE INVENTION

Web analytics is the measurement, collection, analysis, and reporting of web data for purposes of understanding and optimizing web usage. Web analytics can be used as a tool to assess and improve the effectiveness of a website. Web analytics may be off-site, on-site, or a combination of the two. Off-site web analytics refers to web measurement and analysis, regardless of whether a person owns a website, and includes the measurement of a website's potential audience, webpage loading time, data accessed, type of device used to access the site by a user, and potentially other information. On-site web analytics can be used by the owner of a website to measure a visitor's behavior on the website. On-site web analytics can include user interface (UI) widget element accesses, user inaction, user interactions on a webpage, inaction on a webpage (e.g., hovering a mouse), mouse clicks on a webpage, and potentially other information.

Web design encompasses many different skills and disciplines in the production and maintenance of websites. The different areas of web design include web graphic design; interface design; authoring, including standardized code and proprietary software; user experience design; and search engine optimization. Often, many individuals will work in teams covering different aspects of the design process. The term "web design" is normally used to describe the design process relating to the front-end (client side) design of a website including writing mark up. Web design partially overlaps web engineering in the broader scope of web development. Web designers are expected to have an awareness of usability and if their role involves creating mark up then they are also expected to be up to date with web accessibility guidelines.

In marketing, A/B testing is a simple randomized experiment with two variants, A and B, which are the control and treatment in the controlled experiment. A/B testing is a form of statistical hypothesis testing. Other names for statistical hypothesis testing include randomized controlled experiments, online controlled experiments, and split testing. In online settings, such as web design (especially user experience design), the goal of A/B testing is to identify changes to web pages that increase or maximize an outcome of interest (e.g., click-through rate for a banner advertisement). As the name implies, two versions (A and B) are compared, which are identical except for one variation that might affect a user's behavior. For example, version A might be the currently used version (control), while version B is modified in some respect (treatment). For instance, on an e-commerce website the purchase funnel is typically a good candidate for A/B testing, as even marginal improvements in drop-off rates can represent a significant gain in sales. Significant improvements can sometimes be seen through testing elements like copy text, layouts, images, and colors. The vastly larger group of statistics broadly referred to as multivariate or multinomial testing is similar to A/B testing, but may test more than two different versions at the same time and/or has more controls, etc. Simple A/B tests are not valid for observational, quasi-experimental or other non-experimental situations, as is common with survey data, offline data, and other, more complex phenomena.

SUMMARY

Aspects of an embodiment of the present invention disclose a method, computer program product, and computing system for selecting a version of a webpage to present to a user. A processor receives a request to access a webpage from a device, wherein the webpage includes a plurality of versions of the webpage. A processor receives information about the device. A processor determines a version of the webpage to present, based on the information about the device and a predefined goal associated with the webpage. A processor causes the version of the webpage to be presented.

DETAILED DESCRIPTION

In one embodiment, the present invention integrates user characteristics along with goal-centric analytics to display to users the webpage with the highest likelihood of meeting the user's goals and the overall goals of the website. The webpage is broken up into a number of modules, such as left navigation, top navigation, center image, central wording, and footer. Different versions of each module, as well as different layouts of the modules, are created by a web designer. Objective website goals, such as, higher number of sales, higher dollar amount per sale, length of time users are on the site, or number of reviews written are determined. User goals, such as, satisfaction or usefulness are also determined. Different module layouts and module content is displayed to live users and, over time, the layout and module versions that lead to the highest user satisfaction or usefulness and most closely meet the goals of the website (e.g., higher sales, more sales) are displayed more often.

The present invention will now be described in detail with reference to the Figures.

Figure 1:
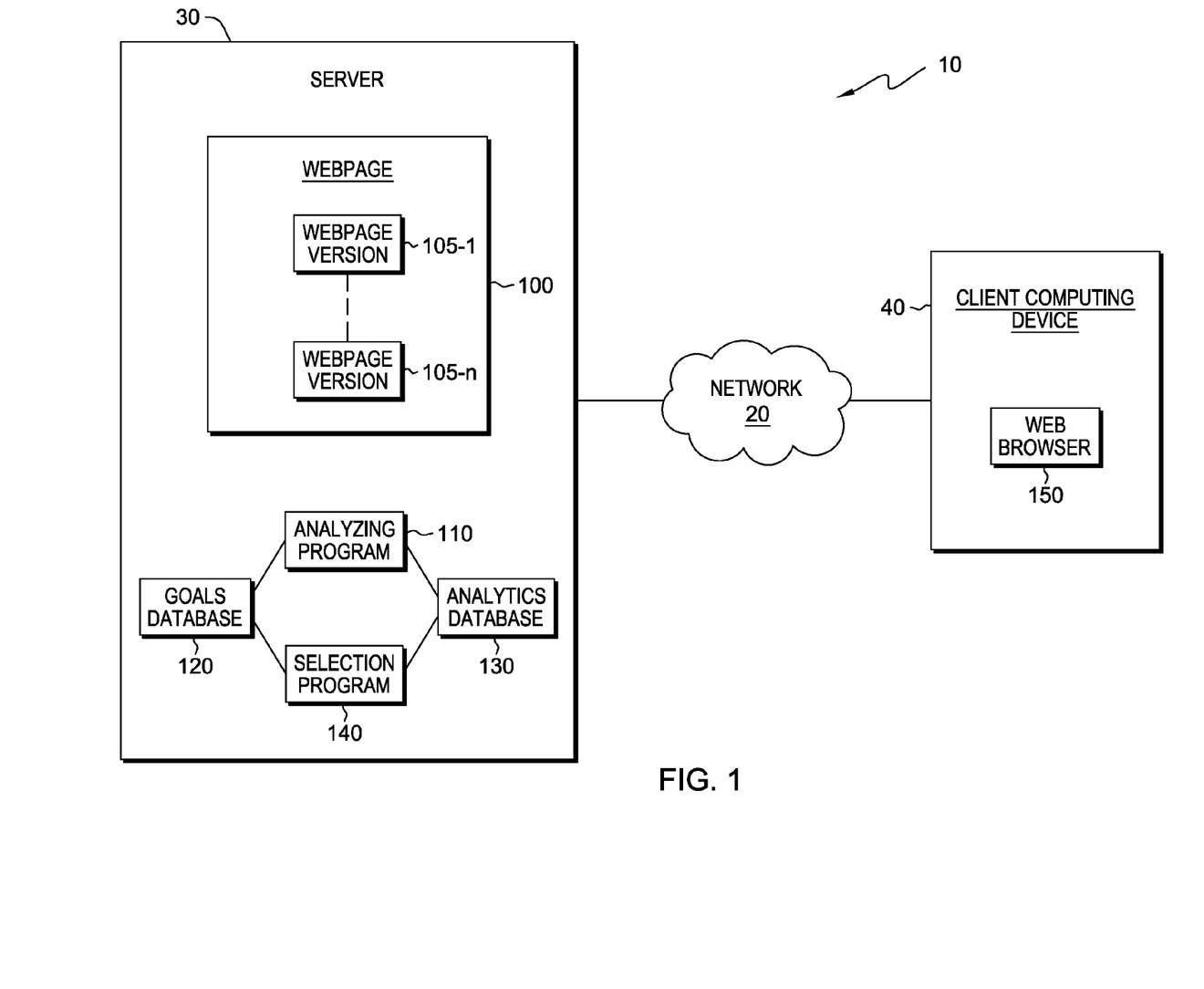
FIG. 1 depicts a diagram of a computing system, in accordance with an embodiment of the present invention.

FIG. 1 depicts a diagram of computing system 10, in accordance with one embodiment of the present invention. FIG. 1 provides an illustration of one embodiment and does not imply any limitations with regard to the environments in which different embodiments may be implemented.

In the depicted embodiment, webpage version 105 is labeled as "1-n" which signifies there may be one webpage version 105 or any number (e.g., n-number) of webpage version 105 in various embodiments of the present invention. Hereafter, webpage version 105, when mentioned without "1-n," will signify any one specific webpage within the collective webpage version 105 "1-n."

In the depicted embodiment, computing system 10 includes server 30 and client computing device 40 interconnected over network 20. Network 20 may be a local area network (LAN), a wide area network (WAN) such as the Internet, a cellular data network, any combination thereof, or any combination of connections and protocols that will support communications between server 30 and client computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with client computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains webpage 100, webpage version 105, analyzing program 110, goals database 120, analytics database 130, and selection program 140. Server 30 may include components, as depicted and described in further detail with respect to FIG. 5.

Client computing device 40 may be a desktop computer, laptop computer, netbook computer, tablet computer, personal digital assistant (PDA), or smart phone. In general, client computing device 40 may be any electronic device or computing system capable of processing program instructions, sending and receiving data, and communicating with server 30 via network 20. Client computing device 40 contains web browser 150. Client computing device 40 may include components, as depicted and described in further detail with respect to FIG. 5.

Web browser 150 may be a generic web browser used to retrieve, present and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user at client computing device 40 to access webpage 100 over network 20. In the depicted embodiment, web browser 150 resides on client computing device 40. In other embodiments, web browser 150, or similar web browsers, may reside on other client computing devices capable of accessing webpage 100 over network 20.

Webpage 100 may be any web document containing information accessible to other computing devices, such as client computing device 40, through a web browser over network 20. Webpage 100 may include one or more widgets (e.g., JavaScript widgets), page objects, user interface elements, images, or other elements. A widget is a stand-alone, or self-contained, application or set of script or code for use within a webpage, such as webpage 100. In general, webpage 100 may be any webpage capable of being monitored by analyzing program 110.

In one embodiment, analyzing program 110 receives an indication when a user accesses webpage 100. After this indication, analyzing program 110 retrieves predefined goals and monitors the usage of webpage 100. Analyzing program 110, then, stores the results of the monitored usage for later use.

Analyzing program 110 may be a web analytics tool or other analytics software that operates to retrieve user characteristics and collect and store data about users visiting a webpage, such as webpage 100. In general, analyzing program 110 may be any analytics, or web analytics, program capable of collecting, analyzing, and/or reporting data related to user characteristics and usage of a webpage, such as webpage 100. In some embodiments, analyzing program 110 performs an analysis of webpage 100, and monitors and collects information based on user characteristics, such as device type, IP location, previous websites visited (web browsing history), and cookies. In some embodiments, analyzing program 110 performs an external, or off-site, analysis of webpage 100, and collects information related to hyper-text markup language (HTML) pages loaded, data accessed, widgets used, or other information. Typically, external analysis is used to provide analysis for websites that are designed to request one page at a time from the server. In some embodiments, analyzing program 110 performs an internal, or on-site, analysis of webpage 100, and collects information, such as: user idle time, mouse clicks on webpage 100, items or objects used on webpage 100, cursor location, cursor hovering, or other information. In some embodiments, analyzing program 110 performs both internal and external analysis functions.

In some embodiments, analyzing program 110 generates analytics reports and/or a set of information is gathered from a webpage, such as webpage 100, and stores the information to analytics database 130. An analytics report may include information related to a particular version of webpage 100, such as webpage version 105, and include information related to user characteristics and/or the usage of webpage 100 over, for example, a specified time period. In some embodiments, analyzing program 110 collects data from a webpage, such as webpage 100, by accessing server log files, in which a web server records file requests by browsers (e.g., access logs). In some embodiments, analyzing program 110 uses a page tagging method, wherein JavaScript embedded in the site page is used to make image requests to a third-party analytics-dedicated server, whenever a page is rendered by a web browser, or whenever a mouse click occurs. Analyzing program 110 may utilize additional data sources to augment the website and website behavior described herein. In some embodiments, an analytics report may include information relevant to a web developer regarding the use, or lack of use, of certain pages, portions of the page, or pieces of data used within a website or webpage 100. In some embodiments, analyzing program 110 is a function of selection program 140. In other embodiments, analyzing program 110 is a stand-alone web analytics tool or analysis software/application. In some embodiments, analyzing program 110 resides on server 30. In other embodiments, analyzing program 110 may reside on another server or another computing device, provided that analyzing program 110 has access to webpage 100, goals database 120, and analytics database 130.

Goals database 120 may be a repository that may be read by analyzing program 110 and selection program 140. In some embodiments, a program (not shown) may allow a web developer, administrator, or other user to define goals and write the defined goals to goals database 120. Goals relevant to the layout or population of data on a webpage, such as webpage 100, may be stored to goals database 120. Example goals stored to goal database 120 may include selling a certain amount of merchandise per visit to webpage 100, increase user shopping efficiency, have a user-friendly layout, minimize the amount of user confusion, or any other goal that a web developer or other user may specify. In some embodiments, goals database 120 associates a set of one or more goals for webpage 100 with a particular device, or type of device (e.g., smartphone, tablet, PC, etc.). For example, one set of goals for webpage 100 stored to goals database 120 may indicate layout goals associated with smartphone devices, while a different set of goals for webpage 100 stored to goals database 120 may specify a different set of one or more goals associated with tablet devices. In still other embodiments, goals database 120 may associate a set of one or more goals for webpage 100 with additional factors, such as geographic location of the accessing user, time of day of the access request, time of the month of the access request, time mouse hovers over certain links, amount of mouse clicks it takes to get to an end result, and time spent viewing a particular module. In some embodiments, a predetermined correlation threshold may be stored to goals database 120. This correlation threshold is used when determining which webpage to present to the user. In one embodiment, goals database 120 resides on server 30. In other embodiments, goals database 120 may reside on another server, another computing device, or client computing device 40, provided that goals database 120 is accessible to analyzing program 110 and selection program 140.

Analytics database 130 may be a repository that may be written to and/or read by analyzing program 110 and/or selection program 140. User characteristics, analytics reports and web analytics information gathered, recorded, deciphered or otherwise observed by analyzing program 110 may be stored to analytics database 130. For example, analytics information, user characteristics, the time the information was gathered, identifying characteristics of users, and other information may be stored to analytics database 130. In one embodiment, analytics database 130 resides on server 30. In other embodiments, analytics database 130 may reside on another server, another computing device, or client computing device 40, provided that analytics database 130 is accessible to analyzing program 110 and selection program 140.

Selection program 140 may operate to retrieve user characteristics, goals, such as goals stored to goals database 120, and analytics information, such as analytics information stored on analytics database 130, to select and display the most suitable version of a webpage, such as webpage version 105, to a user at client computing device 40. In some embodiments, selection program 140, or a separate feedback program (not shown), allows the user to give feedback on the layout of webpage version 105. In some embodiments, selection program 140 further considers one or more user characteristics and selects and displays the most suitable version of a webpage, such as webpage version 105, based upon one or more user characteristics of the user accessing the information. For example, user characteristics of a user accessing webpage 100 may vary based on device type, IP location, cookies, previous websites visited, or any other user characteristics. In some embodiments, selection program 140 selects and displays the most suitable version of the webpage, such as webpage version 105, based upon usage patterns observed by analyzing program 110. For example, usage patterns of webpage 100 may vary based upon the time webpage 100 was accessed, the most popular links used while on webpage 100, or other identified patterns. In some embodiments, selection program 140 retrieves goals associated with a webpage, such as webpage 100, from goals database 120. In some embodiments, selection program 140 retrieves analytics information from analytics database 130. In one embodiment, selection program 140 resides on server 30. In other embodiments, selection program 140 may reside on another server, another computing device, or client computing device 40, provided that selection program 140 has access to webpage 100, goals database 120, and analytics database 130.

While the depicted embodiment specifies a webpage, such as webpage 100, other embodiments of the present invention may perform similar functionality with regard to an application or program capable of having multiple versions. For example, embodiments of analyzing program 110 may monitor user characteristics and usage information of a program (not shown) on client computing device 40. Based on the user characteristics and usage information obtained, an alternate version of selection program 140 may cause layout and other aspects of the program on client computing device 40 to be altered. For example, navigation bars within the program may be reorganized, frequently used menu items may become toolbar icons, and information most frequently viewed may be placed in a prominent position within the program, according to similar methods described herein with regard to webpage 100 and selection program 140.

Figure 2:
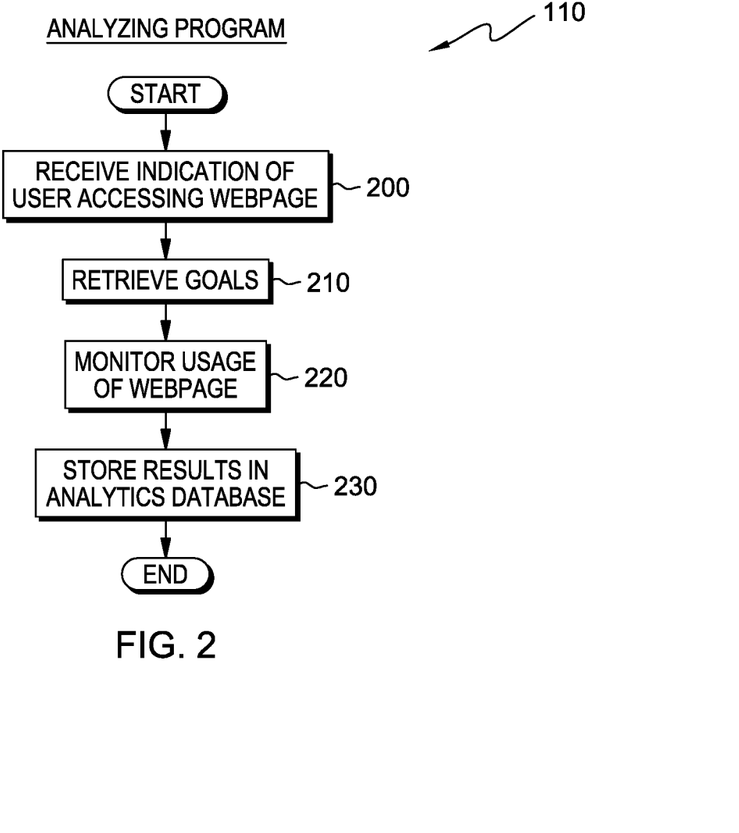
FIG. 2 depicts a flowchart of the steps of an analyzing program, executing within the computing system of FIG. 1, for monitoring usage of webpage versions and storing results in an analytics database, for further analysis by a selection program, in accordance with an embodiment of the present invention.

FIG. 2 depicts a flowchart of the steps of analyzing program 110, executing within the computing system of FIG. 1, in accordance with an embodiment of the present invention. Analyzing program 110 operates to monitor the usage of webpage 100 and add user characteristics and usage and analytics results to analytics database 130, for further analysis by selection program 140, in accordance with one embodiment of the present invention. Using a series of predefined goals, analyzing program 110 can narrow its focus when monitoring and analyzing the usage of webpage 100.

In one embodiment, initially, a web developer, or other user, may create webpage 100. In such an embodiment, a web developer, or other user, moves and resizes various modules in random positions within the webpage. In another embodiment, a software program or application may create webpage 100. In this embodiment, a web developer, or other user, inputs various modules into the software program or application. The software program or application, then, moves and resizes the modules in random positions within the webpage. Webpage 100 may be a single webpage or a website comprising multiple webpages. While not depicted, it should be noted that webpage 100 may be a software program or application, rather than a webpage or website, wherein a program or tool similar to analyzing program 110 may monitor usage and gather user characteristic and analytical information related to usage by one or more users of the software program or application. A web developer, or other user, may also utilize one or more analytics tools, such as analyzing program 110, to monitor webpage 100 and gather user characteristic and usage information by users accessing or attempting to access webpage 100.

Further, a web developer, or other user, may generate one or more goals for webpage 100, which may, eventually, affect the presentation of webpage 100. In some embodiments, one or more sets of general goals may exist. For example, one set of goals may not be directed toward any specific user characteristic. In this case, all user characteristics would have to be analyzed. In some embodiments, one or more sets of specific goals may exist. For example, one set of goals may be directed toward a tablet device attempting to access webpage 100, while another set of goals may be directed toward a desktop environment attempting to access webpage 100. In another example, one set of goals may be directed toward a device with touchscreen capabilities, while another set of goals is directed toward devices that lack touchscreen capabilities. In such cases, analyzing program 110 would only monitor and analyze the user characteristic(s) in question.

In step 200, analyzing program 110 receives an indication of a user accessing, or attempting to access, webpage 100. In some embodiments, analyzing program 110 may receive an indication of a user accessing, or attempting to access, webpage 100 from a computing device, such as client computing device 40. The indication of a user accessing, or attempting to access, webpage 100 may include information indicating user characteristics, such as the IP address, network provider, and/or type of device (e.g., smartphone, desktop computer, etc.) accessing, or attempting to access, webpage 100.

In step 210, analyzing program 110 retrieves goals listed for the website. In some embodiments, analyzing program 110 retrieves goals from a repository, such as goals database 120. As previously described, a variety of goals may be created by a web developer of webpage 100, indicating goals relevant to the presentation of more suitable versions of webpage 100, based on factors, such as user characteristics, usage, page object properties, user interface element properties, or other information. For example, a goal may be to attain the highest dollar amount per sale per visit to the website. This may be considered a general goal and analyzing program 110 may monitor or analyze visits to the webpage by all users attempting to access the webpage, regardless of their device or other user characteristics.

In step 220, analyzing program 110 monitors the usage of webpage 100. Analyzing program 110 may include internal (on-site), and/or external (off-site) analytics techniques for gathering usage information. Embodiments for analyzing program 110 may monitor externally accessible information, such as HTML pages loaded, data accessed, widgets (e.g., JavaScript widgets) used, types of devices used to access webpage 100, or the presences of user interface (UI) artifacts, such as images or other information within cascading style sheets (CSS). Embodiments of analyzing program 110 may also monitor internal information, such as cursor location, mouse clicks, idle time, or other information. Cursor location, such as a cursor hovering over a field for an extended period of time, may indicate confusion by the user controlling the cursor. Similarly, idle time of a user may indicate that the user is experiencing confusion with webpage 100. Mouse clicks within webpage 100, or a website, may be used to track the items used on webpage 100, or a website, as well as previous and/or subsequent pages that were loaded (e.g., by following a trail of selected hyperlinks). In some embodiments, analyzing program 110 may associate patterns of use based on the type of device or other potential group that affects how users tend to use a webpage, such as webpage 100.

In step 230, analyzing program 110 stores results to a repository, such as analytics database 130. In some embodiments, analyzing program 110 may generate one or more reports that include a collection of user characteristics and web analytics and usage information. In other embodiments, analyzing program 110 may store information gathered, such as: device type, IP address, previous websites visited, cookies, web analytics, and usage information. In some embodiments, generated reports, or information obtained, are stored to analytics database 130, for access by selection program 140.

Figure 3:
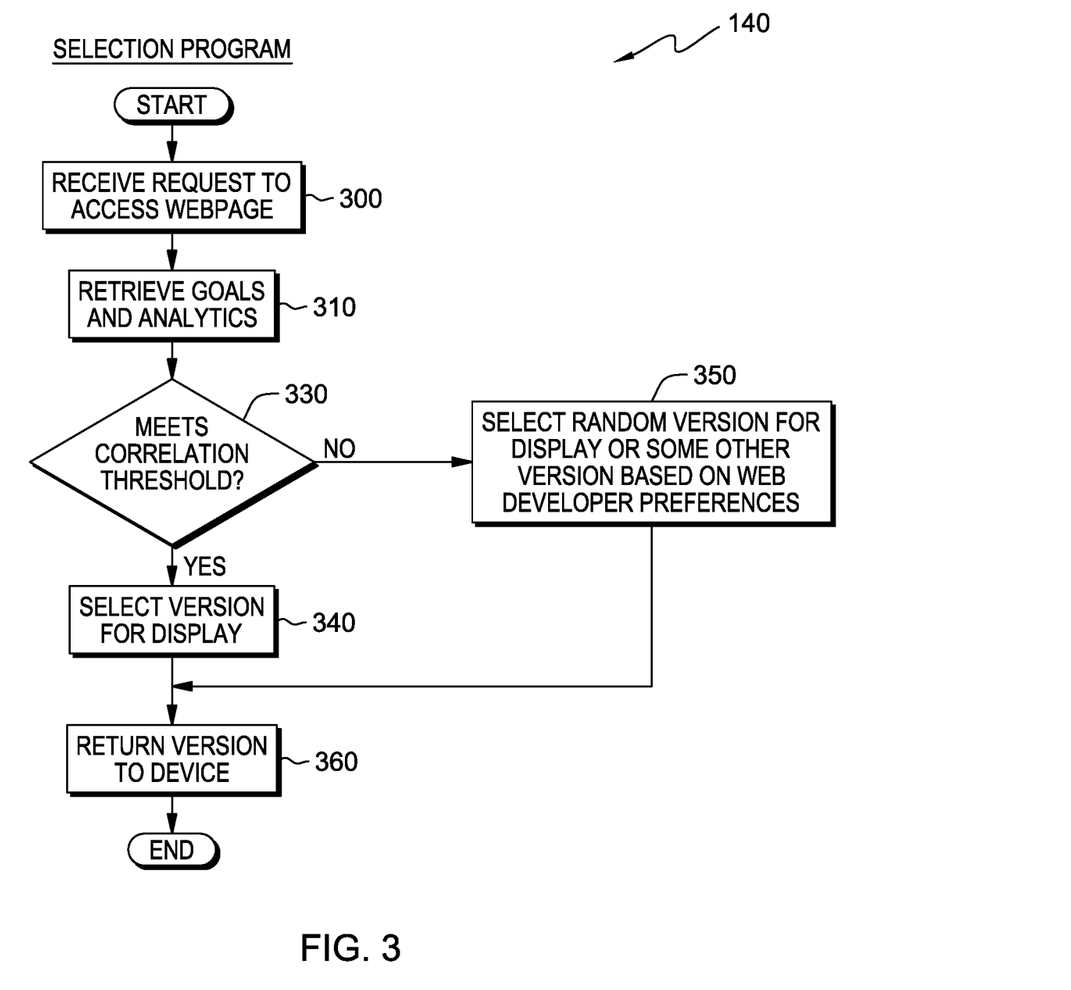
FIG. 3 depicts a flowchart of the steps of a selection program, executing within the computing system of FIG. 1, for selecting a webpage version for display to a user, in accordance with an embodiment of the present invention.
Figure 4A:
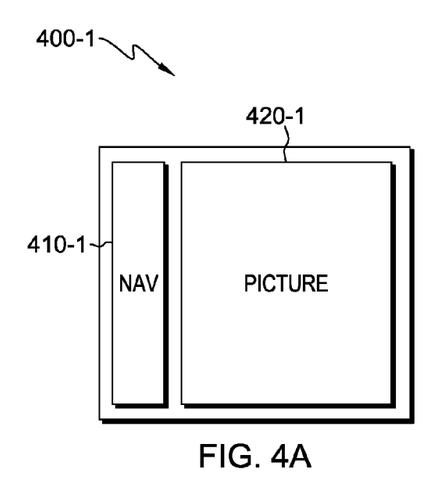
FIG. 4A depicts a first example webpage version with a navigation bar and a picture, in accordance with an embodiment of the present invention.
Figure 4B:
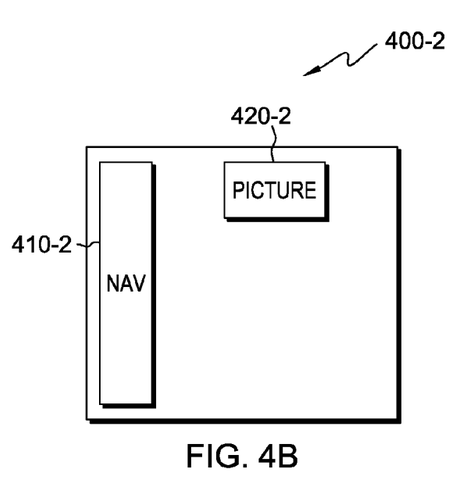
FIG. 4B depicts a second example webpage version with a navigation bar and a picture, in accordance with an embodiment of the present invention.
Figure 4C:
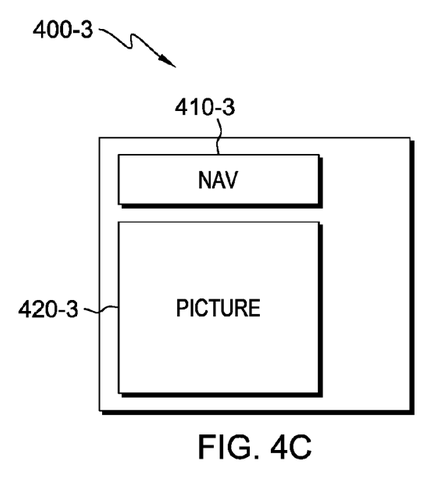
FIG. 4C depicts a third example webpage version with a navigation bar and a picture, in accordance with an embodiment of the present invention.
Figure 4D:
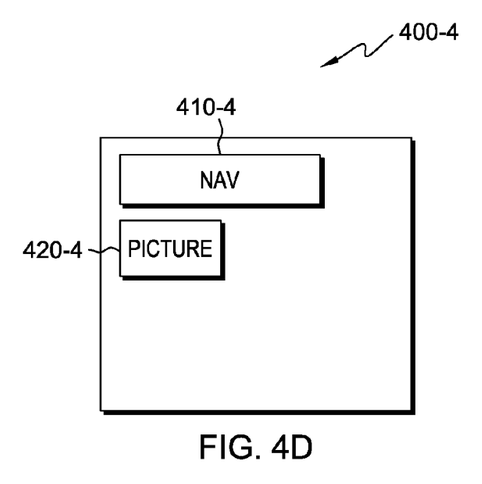
FIG. 4D depicts a fourth example webpage version with a navigation bar and a picture, in accordance with an embodiment of the present invention.

FIG. 3 depicts a flowchart of the steps of selection program 140, executing within the computing system of FIG. 1, in accordance with an embodiment of the present invention. Selection program 140 operates to select and cause to display a version of webpage 100, such as webpage version 105, based on user characteristic and usage and analytics information gathered by analyzing program 110, in accordance with one embodiment. Using a series of predefined goals, selection program 140 can select different versions of webpage 100, such as webpage version 105, based on factors such as user characteristics (e.g., accessing device, IP location, cookies, etc.), as well as web analytics information (e.g., user idle time, popular links, time spent on page, etc.).

In some embodiments, selection program 140 does not select a specific layout of webpage 100 and presents a random version of webpage 100 at runtime when client computing device 40 requests to access webpage 100. For example, selection program 140 may present a random version of webpage 100 before there is enough data to actually know which webpage version 105 would be the best to show. In other embodiments, such as after enough data has been collected, selection program 140 does select a specific layout of webpage 100, such as webpage version 105, based on updated user characteristics, usage, and analytics information, and/or reports generated by analyzing program 110, and presents this specific webpage version 105 at runtime when client computing device 40 requests to access webpage 100.

In step 300, selection program 140 receives a request to access webpage 100. In some embodiments, selection program 140 may receive a request to access webpage 100 from a computing device, such as client computing device 40. The request to access webpage 100 may include information indicating user characteristics, such as the type of device (e.g., tablet, desktop computer, smartphone, etc.) attempting to access webpage 100.

In step 310, selection program 140 retrieves applicable goals for webpage 100 as well as applicable user characteristics, analytics and usage information, and/or one or more reports, as generated by a web analytics program, such as analyzing program 110. In one embodiment, selection program 140 may retrieve goals applicable to webpage 100 from a repository accessible by selection program 140, such as goals database 120. Selection program 140 may also retrieve applicable user characteristic information, analytics and usage information, and/or one or more reports from a repository accessible by selection program 140, such as analytics database 130. In another embodiment, selection program 140 receives relevant information or reports directly from analyzing program 110. As previously mentioned, information or analytics reports may include usage information generated by analyzing program 110. Usage information may include HTML pages loaded, data accessed, types of devices used, widget use, or other information relevant to the usage of a webpage, such as webpage 100. In some embodiments, information or analytics reports may be linked to device types, times of usage, or other information. This information may indicate particular ways users tend to interact with a webpage, such as webpage 100.

In decision 330, selection program 140 determines whether or not a predetermined correlation threshold is met. In one embodiment, the threshold may be determined by a certain number of times the webpage, such as webpage 100, has been accessed. For example, there may be a requirement to have the webpage, such as webpage 100, accessed at least 100 times. Once the webpage has been accessed 100 times, then the threshold is met. In another embodiment, the threshold may be determined by a certain number of times the webpage, such as webpage 100, has been accessed by a particular type of device. For example, there may be a requirement to have the webpage, such as webpage 100, accessed 100 times by a user on a PC. Once the webpage has been accessed 100 times by a user on a PC, then the threshold is met. In another embodiment, the threshold may be determined by comparing the goals to the previous user characteristics and usage and analytic data. There may any number of goals, but a predetermined number must match/associate with the previous user characteristics and usage and analytic data to meet the threshold. For example, there may be three goals for a single page that read: to better accommodate PC users, to make the website user friendly, to sell the most merchandise in the least amount of time. If the predetermined threshold is three matches, and the previous user characteristics and usage and analytics data correspond to the aforementioned list of three goals, then the correlation threshold is met.

If the correlation threshold is not met (decision 330, no branch), selection program 140 may present a random version of the webpage, such as webpage 100, to the device currently accessing the webpage (step 350). In step 350, in other embodiments, a web developer, or other user, may specify which version is to be displayed. If the correlation threshold is met (decision 330, yes branch), selection program 140 will select a version of the webpage, such as webpage version 105, for display (step 340).

In step 340, selection program 140 determines a version of webpage 100, such as webpage version 105, for display based on a comparison of how the goals compare to the previously stored user characteristics and usage and analytics information received. Selection program 140 uses this comparative information to match with the current user's user characteristics. After selection program 140 selects the most appropriate version to webpage 100, such as webpage version 105, selection program 140 returns the selected webpage version 105 back to the device attempting to access the webpage (step 360). In one embodiment, selection program 140 will display a survey to the user once the particular version of the webpage, such as webpage version 105, is closed. Such a survey can be used to assess a user's like or dislike of the webpage version, such as webpage version 105, selected. The responses to this survey may be sent to analytics database 130 and can be used as another tool to select the most suitable webpage for future users.

FIGS. 4A-4D are examples of user interface windows for website versions of a website as accessed by a web browser, in accordance with one embodiment of the present invention. Other types of user interface windows, module types, and layouts are possible. User interface window 400 may be a user interface window for webpage 100 of server 30 as viewed by a user at a client computing device, such as client computing device 40, using a web browser, such as web browser 150. The client computing device can be a desktop, laptop, mobile device, tablet, or any other suitable device. In the depicted environment, user interface windows 400-1 through 400-4 are four separate versions of webpage 100 created by the web developer or other user or by a software program or application to be sent out randomly to users when a predetermined correlation threshold is not met, prior to selections generated by embodiments of selection program 140, based on user characteristics, analytics and usage information.

User interface window 400 of webpage 100 contains two modules: navigation bar 410 and picture 420. Navigation bar 410 may display text, icons, hyperlinks, or any other information for navigation within the website associated with webpage 100, or for navigation to external websites or webpages. In the depicted embodiments, the navigation bars are various sizes and located in various positions. Picture 420 may display images, which may include text, icons, or any other information that may be necessary to assist or explain the picture to the user. Within user interface windows 400-1 through 400-4, the modules are of various sizes and are located in various positions within each respective user interface window. In some embodiments, modules may be added or taken away. One instance where modules may be added, or taken away, is when more, or less, space is made from the shifting and resizing of certain modules of the webpage. For example, when certain modules are made smaller, there can be advertising added to the new open space. Hence, each version of webpage 100 may comprise certain modules displayed in a unique arrangement.

Figure 5:
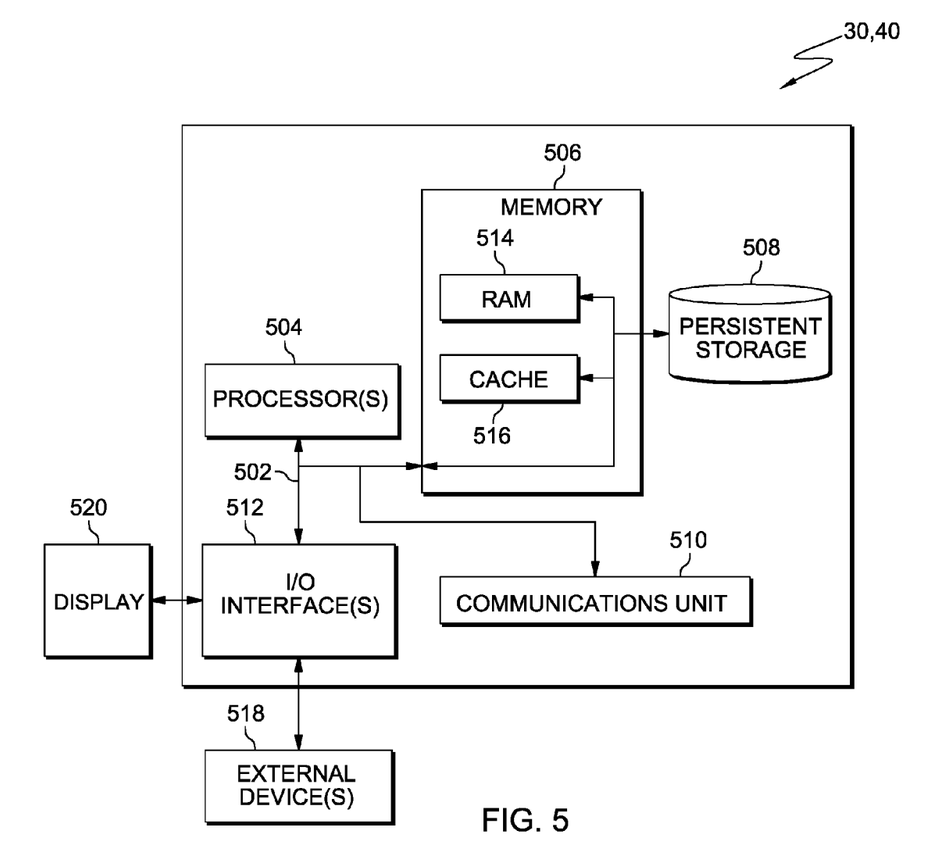
FIG. 5 depicts a block diagram of components of the server and the client computing devices, in accordance with an embodiment of the present invention.

FIG. 5 depicts a block diagram of components of server 30 and client computing device 40, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Sever 30 and client computing device 40 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Webpage 100, webpage version 105, analyzing program 110, goals database 120, analytics database 130, and selection program 140 are stored in persistent storage 508 of server 30 for execution and/or access by one or more of the respective computer processors 504 of server 30 via one or more memories of memory 506 of server 30. Web browser 150 is stored in persistent storage 508 of client computing device 40 for execution by one or more of the respective computer processors 504 of client computing device 40 via one or more memories of memory 506 of client computing device 40. In this embodiment, persistent storage 508 includes a magnetic hard disk drive. Alternatively, or in addition to magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Webpage 100, webpage version 105, analyzing program 110, goals database 120, analytics database 130, and selection program 140 may be downloaded to persistent storage 508 of server 30 through communications unit 510 of server 30. Web browser 150 may be downloaded to persistent storage 508 of client computing device 40 through communications unit 510 of client computing device 40.

I/O interface(s) 512 allows for input and output of data with other devices that may be connected to server 30 or client computing device 40. For example, I/O interface 512 may provide a connection to external device(s) 518, such as keyboard, keypad, a touch screen, and/or some other suitable input device. External device(s) 518 can also include portable computer readable storage media (e.g., thumb drives, portable optical or magnetic disks, and memory cards). Software and data used to practice embodiments of the present invention, e.g., webpage 100, webpage version 105 analyzing program 110, goals database 120, analytics database 130, and selection program 140, can be stored on such portable computer readable storage media and can be loaded onto persistent storage 508 of server 30 via I/O interface(s) 512 of server 30. Software and data used to practice embodiments of the present invention, e.g., web browser 150, can be stored on such portable computer readable storage media and can be loaded onto persistent storage 508 of client computing device 40 via I/O interface(s) 512 of client computing device 40. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selecting a version of a webpage to present to a user, the method comprising:
    receiving, by one or more processors, an indication of a user accessing the webpage, wherein the webpage includes a plurality of versions of the webpage, wherein the webpage is comprised of one or more modules, and wherein each version of the plurality of versions of the webpage comprises a different layout of the one or more modules;
    retrieving, by one or more processors, a predefined goal associated with the webpage, wherein the predefined goal includes a higher number of sales, higher dollar amount per sale, length of time a user is on the webpage, usefulness of the webpage, and number of reviews written;
    monitoring, by one or more processors, usage information of the user accessing the plurality of versions of the webpage, based on the predefined goal associated with webpage, wherein the usage information includes: cursor location, mouse clicks, idle time, HTML pages loaded, data accessed, widgets used, types of devices used to access the webpage, and presence of user interface artifacts;
    generating, by one or more processors, a report that includes a collection of user characteristics, web analytics, and the monitored usage information;
    storing, by one or more processors, the monitored usage information of the plurality of versions of the webpage and the generated report;
    receiving, by one or more processors, a request to access the webpage from a device;
    receiving, by one or more processors, information about the device, wherein the information about the device includes: a device type, an Internet Protocol (IP) address, cookies, and a web browsing history;
    accessing, by one or more processors, the monitored usage information of the plurality of versions of the webpage;
    determining, by one or more processors, the version of the webpage of the plurality of versions of the webpage to present at the device, based on the information about the device, the predefined goal associated with the webpage, the monitored usage information, the generated report and user satisfaction information for the plurality of versions of the webpage, wherein the user satisfaction information comprises survey responses from the monitored accesses to the plurality of versions of the webpage; and
    causing, by one or more processors, the determined version of the webpage to be presented.

* * * * *